3,036,007
PROCESS FOR THE MANUFACTURE OF NICKEL ZINC FERRITES
Wilhelmus Joseph Buykx, Henly Beach, South Australia, Australia, assignor to North American Philips Company, Inc., New York, N.Y., a corporation of Delaware
No Drawing. Filed Sept. 12, 1960, Ser. No. 55,146
Claims priority, application Australia July 29, 1960
2 Claims. (Cl. 252—62.5)

The invention relates to a method of manufacturing ferromagnetic ferrite bodies on the basis of iron oxide, $Fe_2O_3$, nickel oxide, NiO, and zinc oxide, ZnO. The materials from which such bodies are built up will be briefly referred to as "nickel-zinc-ferrites" hereinafter. As is well known, such nickel-zinc-ferrites have been widely used in high frequency techniques for many years already, e.g. in the manufacture of magnet cores for high frequency coils and in the manufacture of aerial rods. In order to improve the homogeneity of such materials—homogeneity being an important factor in connection with the magnetic properties of same, in particular the initial permeability ($\mu_0$)—the initial mixture of metal oxides is prefired at a temperature of about 900–1000° C., the sintered product being subsequently cooled, pulverized and again fired, this time, however, at a markedly higher temperature, in general at a temperature higher than 1200° C.

It is also known that in order to obtain nickel-zinc-ferrites having low electromagnetic losses (low loss factor, tan $\delta$) at high frequencies, the oxygen content of said materials is to be carefully adjusted, an oxygen deficiency giving rise to increased electromagnetic losses.

In order to prevent them from baking together, the moulded or extruded pieces to be sintered are to be arranged disconnectedly in the oven, so that they cannot come into contact with each other. This requires an oven of relatively large dimensions. If then, in order to avoid the aforesaid oxygen deficiency, sintering is to be performed in an atmosphere having a high oxygen content, either a large gas-tight (and therefore expensive) oven is to be used or oxygen is amply to be supplied throughout the entire sintering operation. Both of said expedients are obviously uneconomical. Besides, when sintering in an atmosphere having a high oxygen content at temperatures higher than 1200° C., the difficulty is met with that some parts of the oven are not too well able to resist the influence of an oxygen atmosphere.

In view of the difficulties hereinbefore described it is often preferred to perform the technical sintering process in air. However, in this case the sintered bodies will be deficient in oxygen, this circumstance entailing the aforesaid drawback. A remedying after-treatment will then be indispensable, said after-treatment e.g. consisting in subjecting the sintered bodies obtained to an—often prolonged—annealing at a temperature considerably lower than 1200° C., e.g. at a temperature of about 800° C. This annealing treatment may be effected in a gas-tight oven of much smaller dimensions, since now the sintered bodies are no longer apt to bake together. Besides, at this much lower temperature the oven parts are no longer noticeably attacked by oxygen. However, it needs no further comment that a remedying after-treatment of this kind too will complicate the manufacturing process and hence will raise the costs of it just as well.

It is the object of the invention to manufacture nickel-zinc ferrite bodies by a method preventing undesirable oxygen deficiences (and hence undesirably high electromagnetic losses at high frequencies) from being created in such bodies, though without having recourse to a remedying after-treatment in oxygen. According to the present invention the material which has been prefired at a temperature of about 900–1000° C. then cooled and again pulverized is thoroughly mixed with manganese dioxide, $MnO_2$, in an amount of 0.5 to 5% by weight of the amount of prefired product, the mixture thus obtained being subsequently pressed to the desired shape and finally sintered in air at a temperature of 1210–1260° C. It is essential to this process to use manganese dioxide, $MnO_2$, (so no different oxide of manganese), and to add this substance to the prefired product (so not to the initial mixture of iron oxide, nickel oxide and zinc oxide). By the combination of these two essential features the method of the present invention is different from prior art methods, according to which relatively small amounts of manganese are incorporated into nickel-zinc-ferrites as well.

The invention is of particular importance in the manufacture of aerial rods built up from nickel-zinc-ferrites, the chemical constitution of which is pretty well in accordance with the formula $Ni_{0.5}Zn_{0.5}Fe_2O_4$. In this embodiment of the invention it is preferable to mix the prefired product with manganese dioxide, $MnO_2$, in an amount of about 1.75% by weight of the amount of prefired product and to perform the final sintering at a temperature of about 1230 to 1250° C.

The invention will now be described with reference to an example.

EXAMPLE (a) A finely divided mixture of nickel oxide, zinc oxide and iron oxide in a molar ratio of $$NiO:ZnO:Fe_2O_3=1:1:2$$

was prefired at a temperature of 995° C. The prefired product, consisting almost exclusively of a nickel-zinc-ferrite, the chemical constitution of which is in accordance with the formula $Ni_{0.5}Zn_{0.5}Fe_2O_4$, was cooled down to the ambient temperature and ground to a fine powder. This powder was mixed with a binder and extruded to rods which were piled up in an electric oven in which they were gradually heated in air up to a temperature of 1230 to 1250° C. which was maintained for about half an hour, the rods being subsequently slowly cooled down in the oven to the ambient temperature. The quotient $$\frac{\tan \delta}{\mu_0}$$

of the loss factor and the initial permeability was determined at the rods at a frequency of 1 mc./sec. and appeared to be about $6.1 \times 10^{-5}$.

(b) The sintered rods, manufactured according to (a) were annealed for some hours in oxygen at a temperature of about 800° C. and then slowly cooled down to the ambient temperature. The quotient $$\frac{\tan \delta}{\mu_0}$$

was again determined at a frequency of 1 mc./sec. and appeared to be decreased to a value of about $3.3 \times 10^{-5}$.

(c) Alternately the powder of the prefired product referred to in (a) was intimately mixed with finely divided manganese dioxide, $MnO_2$, in an amount of 1.75% by weight of the powder of the prefired product and the mixture thus obtained was extruded to rods described in (a). These rods were again heated in air in the electric oven at a temperature of 1230 to 1250° C. and subsequently slowly cooled down to the ambient temperature. The value of the quotient $$\frac{\tan \delta}{\mu_0}$$

at a frequency of 1 mc./sec. of these rods was determined to be about $3.6 \times 10^{-5}$.

It is shown by these experiments that the results obtained by the method according to the present invention are almost equivalent to those obtained by the time- and heat-consuming annealing method.

What is claimed is:

1. The method of manufacturing of ferromagnetic ferrite bodies on the basis of iron oxide, $Fe_2O_3$, nickel oxide, NiO, and zinc oxide, ZnO, and which also contain a small amount of manganese, comprising the steps of prefiring a finely divided mixture of iron oxide, nickel oxide and zinc oxide at a temperature of about 900–1000° C., mixing with the prefired product manganese dioxide, in an amount of 0.5 to 5% by weight of the amount of prefired product, pressing the mixture thus obtained into the desired shape, and finally sintering the so-pressed and shaped mixture in air at a temperature of 1210 to 1260° C.

2. The method according to claim 1 for the manufacture of aerial rods having a chemical constitution substantially according to the formula $Ni_{0.5}Zn_{0.5}Fe_2O_4$, in which the prefired product is mixed with manganese dioxide, in an amount of about 1.75% by weight of the amount of prefired product, the final sintering being carried out at a temperature of 1230 to 1250° C.

No references cited.